Nov. 9, 1965     R. S. PAULIUKONIS     3,216,211
CRYOGENIC CONTAINER WITH DRAIN TUBE
Filed Sept. 19, 1963

INVENTOR.
RICHARD S. PAULIUKONIS
BY
ATTORNEYS

United States Patent Office 3,216,211
Patented Nov. 9, 1965

3,216,211
CRYOGENIC CONTAINER WITH DRAIN TUBE
Richard S. Pauliukonis, Cleveland, Ohio, assignor to Ryan Industries, Inc., Cleveland, Ohio, a corporation of Ohio
Filed Sept. 19, 1963, Ser. No. 310,026
5 Claims. (Cl. 62—54)

This invention relates to cryogenic equipment and more particularly to devices for reducing boil-off rates and heat leakage through the liquid lines of a cryogenic vessel.

Conventional cryogenic vessels for commercial application comprise an inner vessel for enveloping a cryogenic liquid and an outer vessel enveloping both the inner vessel and an evacuated space exterior to the inner vessel. The evacuated space between the vessels may contain radiation shields, fibers or powder, or combinations of them.

Vessels have been designed to provide a minimum heat loss from the inner vessel to the atmosphere by employing improved insulation and by providing the vessel with a shape that will minimize these losses. All of these commercial vessels are necessarily provided with elements such as fluid conduits that provide undesirable paths of heat inleak to the interior of the vessel from the atmosphere. One such element is the drain line for the vessel. During the storage of a cryogenic liquid, a portion of the liquid is present in the drain line or liquid line. As this liquid approaches the relatively warm end of the conduit adjacent the conduit's juncture with the outer vessel, the liquid evaporates. If deep traps are employed in the conduit, this vapor acts as an isolator to prevent the boil-off of more liquid. If no traps, or only very shallow traps, are present in the conduit, however, the system attains an undesirable steady state wherein the vaporized gas pushes back into the container and bubbles up to join the gas phase above the main mass of liquid in the inner vessel. The vaporizing gas is constantly replaced by new liquid which flows into the conduit from the main mass of stored liquid. There results a high evaporation loss and/or an undesirably rapid pressure build-up within the inner vessel.

To remedy this situation and decrease the boil-off rate of the vessel, the drain line has been designed as an adequately deep vapor trap to prevent the liquid from flowing to the warmer portions of the conduit. To this end, the conduit has been designed so that the conduit enters the tank horizontally and is bent downwardly toward the bottom of the tank. The effectiveness of the trap is a function of the vertical distance between the end of the downwardly bent portion and the level of the conduit as it enters the double-walled container. Consequently, discharge tubes have been designed to leave the tank at predetermined levels that are spaced a substantial distance above the bottom of the tank so that the vapor pressure of the gas in the relatively warm, horizontal portion of the conduit will not be sufficiently great to overcome the hydrostatic pressure of the liquid at the entry level selected. However, in a sense, this represents wasted storage capacity since the container cannot be emptied below the entry level of the drain tube.

In order to utilize substantially all of the storage capacity of the cryogenic container, drain conduits have been designed so that they have a U-shaped bend (or other equivalent configurations) in the space between the inner and outer vessels. This bend provides an effective trap but if the conduit is to function significantly as a structural member, it must be a straight column between the inner and outer vessels. If it does not function as a structural member and if, therefore, additional supports must be provided between the vessels, these additional supports provide additional heat paths to the cold inner vessel.

All of the above considerations, therefore, have resulted in various compromises between (1) effectiveness of trapping, (2) completeness of drainage, and (3) structural support of the inner vessel at minimum cost in heat inleak.

In one conventional compromise, the conduit enters the tank horizontally near the bottom and has a short, downwardly bent end portion within the inner vessel. This arrangement permits compromises on the adequacy of the trap in order to gain on the completeness of tank drainage. It represents a cost in increased heat inleak in that it permits some continuous flow of liquid along the bottom of the horizontal portion of the conduit and toward the warmer end of the conduit.

It is an object of the present invention to overcome many of the above-mentioned deficiencies of the prior art.

It is a more particular object of this invention to provide a device within the drain conduit or liquid line of a cryogenic tank to reduce boil-off and to reduce heat inleak while allowing for substantially complete drainage and for effective functioning of the conduit as a structural support member.

These and other objects and advantages of the invention will become apparent from the following description and accompanying drawings.

Figure 1:
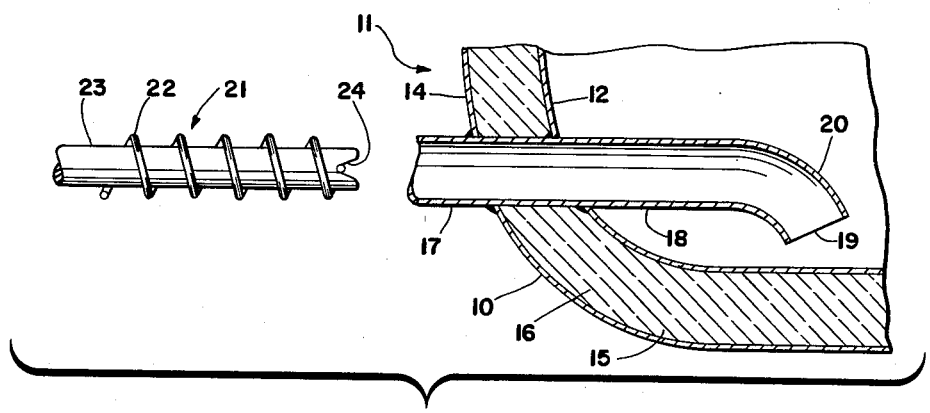
FIGURE 1 is a schematic, fragmentary, cross sectional view of a cryogenic tank having a drain tube and showing a flow resistor device, according to this invention, about to be inserted within the tube.
Figure 2:
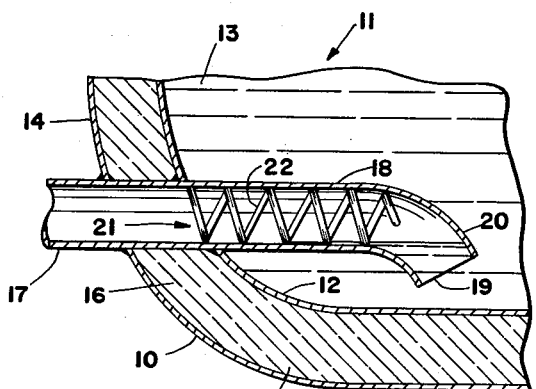
FIGURE 2 is a schematic, fragmentary, cross sectional view similar to FIGURE 1 but showing the flow resistor inserted within the drain tube.

Referring now to the drawings, a bottom end portion 10 of a cryogenic tank 11 is illustrated. The tank 11 comprises a multi-vessel container for a liquefied gas and includes an inner vessel 12 for enveloping a cryogenic liquid 13. The inner vessel 12 may be fabricated from type 304 stainless steel or the like. An outer vessel 14 envelops both the inner vessel 12 and an evacuated space 15 exterior to the inner vessel 12. The outer vessel 14 may be fabricated from plain carbon steel. Radiation shields, fibers, or powder, or combinations of them are indicated by the reference numeral 16 and may be provided in the evacuated space 15. The container is associated with appropriate conventional conduit circuitry, of which only the end of a drain conduit or tube 17 is shown. Usually at least one other conduit (not shown) will communicate with the interior of the vessel at the top thereof.

The drain conduit or tube 17 extends into the tank 11 through the inner and outer vessels and enters the interior of the tank at a location that is very near the bottom of the tank. The conduit 17 has a horizontally extending portion 18 and a trapping means within the tank 11. The trapping means includes walls that close off the opening of the conduit 17 into the interior of the vessel 12 except at a mouth 19 which is below the horizontal portion 18. In the illustrated embodiment, the trapping means comprises a downwardly bent portion 20 of the conduit 17.

A flow resistor 21 is provided within the conduit 17. The flow resistor is preferably a helical spring 22 having an initial outside diameter that is slightly larger than the inside diameter of the conduit. As shown in FIGURE 1, the spring 22 is inserted within the conduit 17 by sliding a mandrel 23 within the spring 22. To gain access to the interior of the tube 17, a connection (not shown) near the tank 11 may be opened, or the operation may be performed only once, during manufacture, while the hot end of the conduit 17 still remains accessible to entry of the mandrel. The mandrel 23 is provided with a notch 24 at its end which receives one end of the spring. The mandrel and spring assembly is forced into the conduit 17 by pushing the mandrel axially with a twisting movement. As it is inserted, the spring 22 will be slightly deflected by the inner sidewall of the conduit. When the mandrel 23 is withdrawn, the spring 22 will grip the sidewall and thereby retain its position within the conduit. The spring may be positioned so that its outer end is an inch or so inward from the juncture between the outer vessel 14 and the conduit 17. The spring 22, furthermore, preferably has an installed axial length of about ¾ of the horizontal distance between the inner end of the conduit 17 and its juncture with the outer vessel 14. The coils of the spring 22 preferably have a pitch corresponding to about ¼ of the inside diameter of the conduit 17 and have an inside diameter corresponding to about ¾ of the inside diameter of the conduit 17.

When the liquid 13 is in the tank 11, which has been provided with the flow resistor 21, a portion of the liquid in the warmer end of the conduit 17 will be vaporized. This vapor will push the liquid in the conduit toward the mouth 19 and the liquid level in the conduit 17 will tend to reach an equilibrium level when the hydrostatic pressure of the liquid is balanced by the vapor pressure of the gas. Because the portion 20 is short, however, some of the liquid 13 will tend to flow along the bottom of the conduit. In conduits according to the prior art, this situation would represent a too-shallow trap and the fluid would be continuously vaporized at the warmer end of the conduit and continuously replaced with more fluid as the vapor forced its way out of the conduit into the main portion of the inner vessel 12. This boil-off is substantially reduced by the present invention because of the curbing effect of the coils of the spring 22. These coils act as arcuately extending curbs that serve to prevent the flow of liquid along the bottom of the horizontally extending portion 18 of the conduit 17. In one specific container design, inclusion of the flow resistor 21 reduces the boil-off rate of the overall container by 20%, the comparison being between the identical container with and without the flow resistor. This represents a significant saving in heat inleak, while at the same time (1) continuing to provide for substantially complete drainage and (2) continuing to allow the drain tube to function effectively as a structural support for the inner vessel so as to avoid the presence of any additional heat inleak paths.

The invention is not restricted to the slavish imitation of each and every one of the details described above, which have been set forth merely by way of example. Obviously, devices may be provided which change, eliminate, or add certain specific details without departing from the invention.

What is claimed is:

1. In a multi-vessel container for a liquefied gas having an inner vessel for enveloping the contained liquid gas,
    an outer vessel enveloping both the inner vessel and an evacuated space exterior to the inner vessel,
    fluid conduit means for conducting fluid between the interior of said inner vessel and the exterior of said outer vessel,
    said fluid conduit means including a drain tube which also helps to structurally support the inner container,
    said drain tube having a portion extending substantially horizontally through the evacuated space from a location outside the outer vessel to the inner vessel, and entering the inner vessel near the bottom thereof, said tube opening into the interior of the inner vessel,
    gas trapping means at the inner end of said tube and comprising walls closing off the opening of said tube into said interior except at a mouth below the level of said substantially horizontally extending tube portion,
    and at least one arcuately extending curb element means within the horizontal portion of the tube and within the inner vessel for inhibiting outward seeping flow of liquid along the bottom of said horizontal tube portion while allowing bypassing draining flow of liquid through said drain tube when said drain tube is opened at a location outside the inner vessel.

2. In a multi-vessel container for a liquefied gas having an inner vessel for enveloping the contained liquid gas,
    an outer vessel enveloping both the inner vessel and an evacuated space exterior to the inner vessel,
    fluid conduit means for conducting fluid between the interior of said inner vessel and the exterior of said outer vessel,
    said fluid conduit means including a drain tube which also helps to structurally support the inner container,
    said drain tube having a portion extending substantially horizontally through the evacuated space from a location outside the outer vessel to the inner vessel, and entering the inner vessel near the bottom thereof, said tube opening into the interior of the inner vessel,
    gas trapping means at the inner end of said tube and comprising walls closing off the opening of said tube into said interior except at a mouth below the level of said substantially horizontally extending tube portion,
    and means within the horizontal portion of the tube and located at least partially within the inner vessel for inhibiting the occurrence of boil-off of liquefied gas within the tube,
    said boil-off-inhibiting means comprising a plurality of arcuately extending, spaced curbing members.

3. The device of claim 2 wherein said curbing members extend annularly and have an inside diameter of about ¾ of the inside diameter of said horizontally extending tube portion.

4. The device of claim 3 wherein said curbing members comprise the coils of a helical wire.

5. The device of claim 4 wherein said helical wire comprises a helical spring which remains at least slightly deflected in installed position, relief from deflection being prevented by engagement of the coils with the inside of the tube whereby the spring is held in place.

References Cited by the Examiner

UNITED STATES PATENTS

| | | | |
|---|---|---|---|
| 2,859,758 | 11/58 | Jurs | 62—55 |
| 2,998,708 | 9/61 | Skinner | 62—45 |
| 3,097,498 | 7/63 | Williams | 62—55 |

ROBERT A. O'LEARY, *Primary Examiner.*